UNITED STATES PATENT OFFICE.

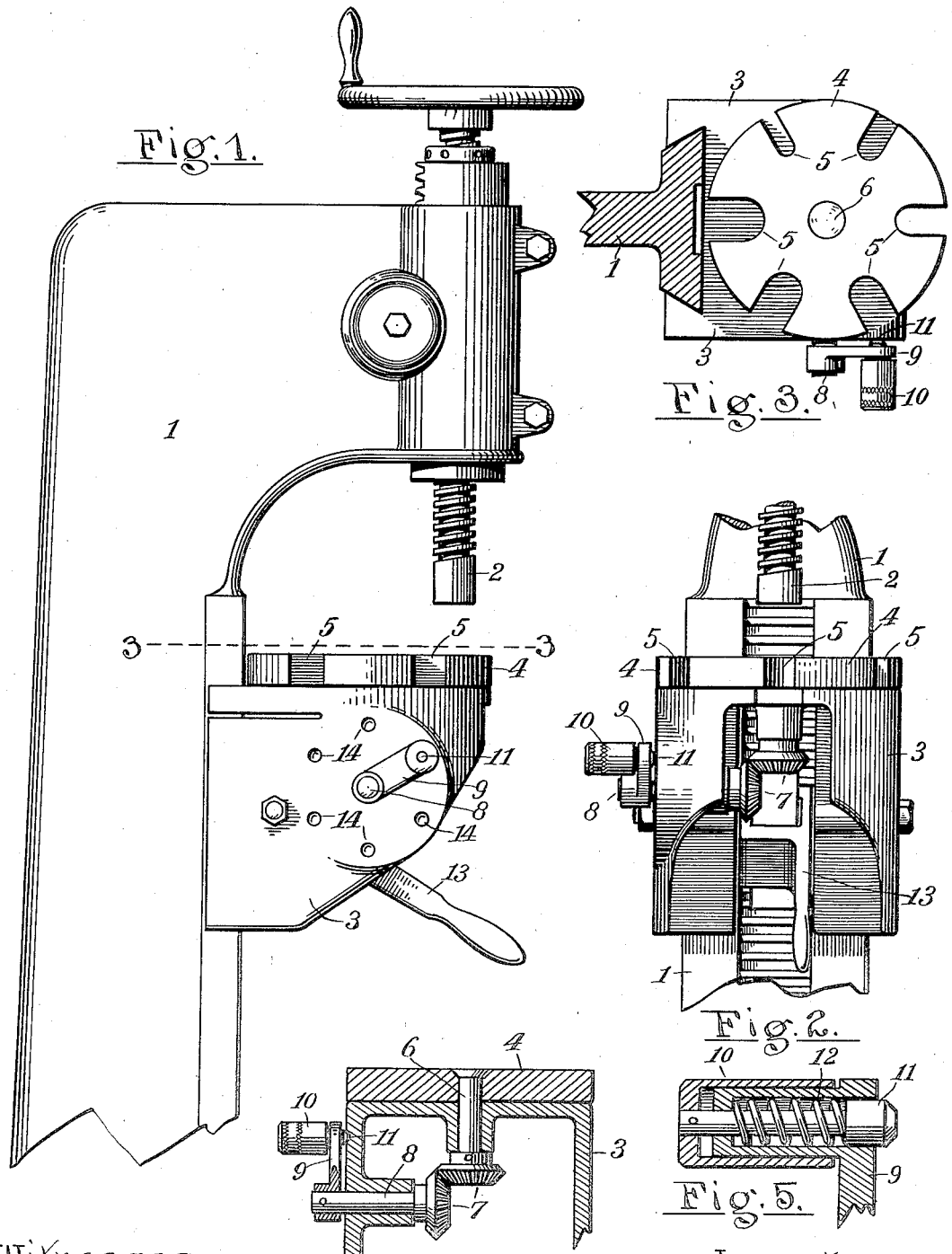

WILLIAM E. ELLIOTT, OF GRAND RAPIDS, MICHIGAN.

ARBOR-PRESS.

1,103,182.
Specification of Letters Patent. Patented July 14, 1914.

Original application filed July 15, 1912, Serial No. 709,419. Divided and this application filed October 23, 1913. Serial No. 796,802.

*To all whom it may concern:*

Be it known that I, WILLIAM E. ELLIOTT, a citizen of the United States of America, residing at Grand Rapids, in the county of Kent and State of Michigan, have invented certain new and useful Improvements in Arbor-Presses; and I do hereby declare the following to be a full, clear, and exact description of the invention, such as will enable others skilled in the art to which it appertains to make and use the same.

This application is a division of my previous application for patent on arbor presses, Serial No. 709,419, filed July 15, 1912.

My present invention relates to improvements in arbor presses, and its object is to provide a device that may be quickly adjusted for different sizes of arbors, and to provide the same with various new and useful features hereinafter more fully described and particularly pointed out in the claims, reference being had to the accompanying drawings, in which:—

Figure 1 is a side elevation of a device embodying my invention; Fig. 2 a front elevation of the same; Fig. 3 a plan view, sectioned on the line 3—3 of Fig. 1; Fig. 4 a detail in vertical section; and Fig. 5 an enlarged sectional detail of the crank and stop.

Like numbers refer to like parts in all of the figures.

1 represents a portion of the frame having an overhanging head carrying a screw operated ram 2 for forcing the arbor downward.

3 is a vertically adjustable knee mounted on the frame and adjusted by the lever 13.

4 is a rotary disk supported by the knee and having marginal recesses 5 to receive various sizes of arbors, the inner end of each recess being semi-circular, the axes of the recesses being equally spaced from each other and at equal distances from the axis of a vertical shaft 6 fixed in the disk to rotate and adjust the same.

Journaled in the knee is a horizontal shaft 8 connected at the inner end to the shaft 6 by miter gears 7. A crank 9 is fixed on the outer end of the shaft 8 to manually rotate and adjust the same and the disk 4. This crank is provided with a telescopic handle 10, the outer portion of which is slidable toward and away from the end of the crank and incloses a hollow fixed portion. In the axis of the crank is a longitudinally slidable pin attached at its outer end to the outer portion of the handle and projecting from the crank at its inner end to engage recesses or indentations 14 in the side of the knee adjacent the crank. This pin is yieldingly forced inward by a spring 12 surrounding the same and is moved outward to disengage the pin from the indentations by pulling on the outer portion of the crank. This outer portion is also rotative on the inner portion to conveniently operate when turning the crank. The indentations 14 are equal in number to the recesses in the disk and are equally spaced about the axis of the shaft 8 and so arranged that when the pin is in one of these indentations a corresponding recess in the disk will be directly beneath the ram 2 and in axial alinement therewith. There is thus an indentation to receive the pin 11 when a respective recess in the disk is beneath the ram. The device is thus quickly and readily adjusted for any respective size of arbor as occasion may require.

What I claim is:—

1. An arbor press, comprising a frame having an overhanging head carrying a ram, a knee on the frame, a rotary disk supported by the knee and having marginal recesses adapted to be brought successively beneath the ram, gearing to rotate the disk, a crank to operate the gearing, and means for holding the crank at intervals corresponding to the intervals between the centers of the recesses in the disk.

2. An arbor press, comprising a frame having an overhanging head carrying a ram, a knee adjustable on the frame, a rotary disk mounted on the knee, a vertical shaft in the axis of the disk and journaled in the knee, a horizontal shaft journaled in the knee, miter gears connecting said shafts, a crank fixed on the horizontal shaft, a handle movably connected to the crank and a stop pin slidable in the crank and connected to the handle, the knee having indentations successively engaged by the pin to hold the several recesses in the disk beneath the ram.

3. An arbor press, comprising a frame having an overhanging head carrying a vertically movable ram, a knee on said frame, a rotary disk carried by the knee and having a series of recesses in its margin spaced apart at intervals, gearing to rotate the disk, a crank connected to the gearing, a hollow telescopic handle on the crank, the outer portion thereof being rotative and slidable on the inner portion, a pin slidable in the handle and projecting from the crank, a spring surrounding the pin to move the same inward to engage indentations at intervals in the knee corresponding to the intervals of the recesses in the disk, said pin also being connected to the outer member of the crank to manually withdraw the pin from the indentations.

In testimony whereof I affix my signature in presence of two witnesses.

WILLIAM E. ELLIOTT.

Witnesses:
HAROLD O. VAN ANTWERP,
PALMER A. JONES.